(12) United States Patent
Shibagami

(10) Patent No.: US 7,512,329 B2
(45) Date of Patent: Mar. 31, 2009

(54) IMAGE PICKUP METHOD, IMAGE PICKUP APPARATUS, PROGRAM FOR IMPLEMENTING THE METHOD, AND STORAGE MEDIUM STORING THE PROGRAM

(75) Inventor: Genjiro Shibagami, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 87 days.

(21) Appl. No.: 11/047,043

(22) Filed: Jan. 31, 2005

(65) Prior Publication Data

US 2005/0190282 A1 Sep. 1, 2005

(30) Foreign Application Priority Data

Jan. 30, 2004 (JP) .............................. 2004-024408

(51) Int. Cl.
*G03B 17/00* (2006.01)

(52) U.S. Cl. .......................................... 396/85; 396/88

(58) Field of Classification Search ............. 396/85–87, 396/131, 88; 348/240.3; 359/696–698
See application file for complete search history.

(56) References Cited

U.S. PATENT DOCUMENTS 5,028,945 A * 7/1991 Kashihara et al. ............. 396/86
5,832,318 A * 11/1998 Sato et al. ..................... 396/86
6,822,686 B1 * 11/2004 Kubo et al. .................. 348/347
6,897,896 B1 * 5/2005 Mizumura ............... 348/240.3

FOREIGN PATENT DOCUMENTS

JP 10-39192 A 2/1998

* cited by examiner

*Primary Examiner*—W. B. Perkey
(74) *Attorney, Agent, or Firm*—Rossi, Kimms & McDowell, LLP

(57) ABSTRACT

An image pickup apparatus that is capable of achieving operating feelings desired by and providing an operability suited to user preference. Pulses are generated by a pulse generating device with rotation of an operating member disposed concentrically with the optical axis of a zoom lens system of a taking lens optical system. A change rate in the operating speed of the operating member is detected. The driving speed of the zoom lens system of the taking lens is determined by referring to an operability parameter table of the relationship between a change rate in the repetition period of output pulses with a change in the rotational speed of the operating member and the driving speed of the zoom lens system of the taking lens.

10 Claims, 9 Drawing Sheets

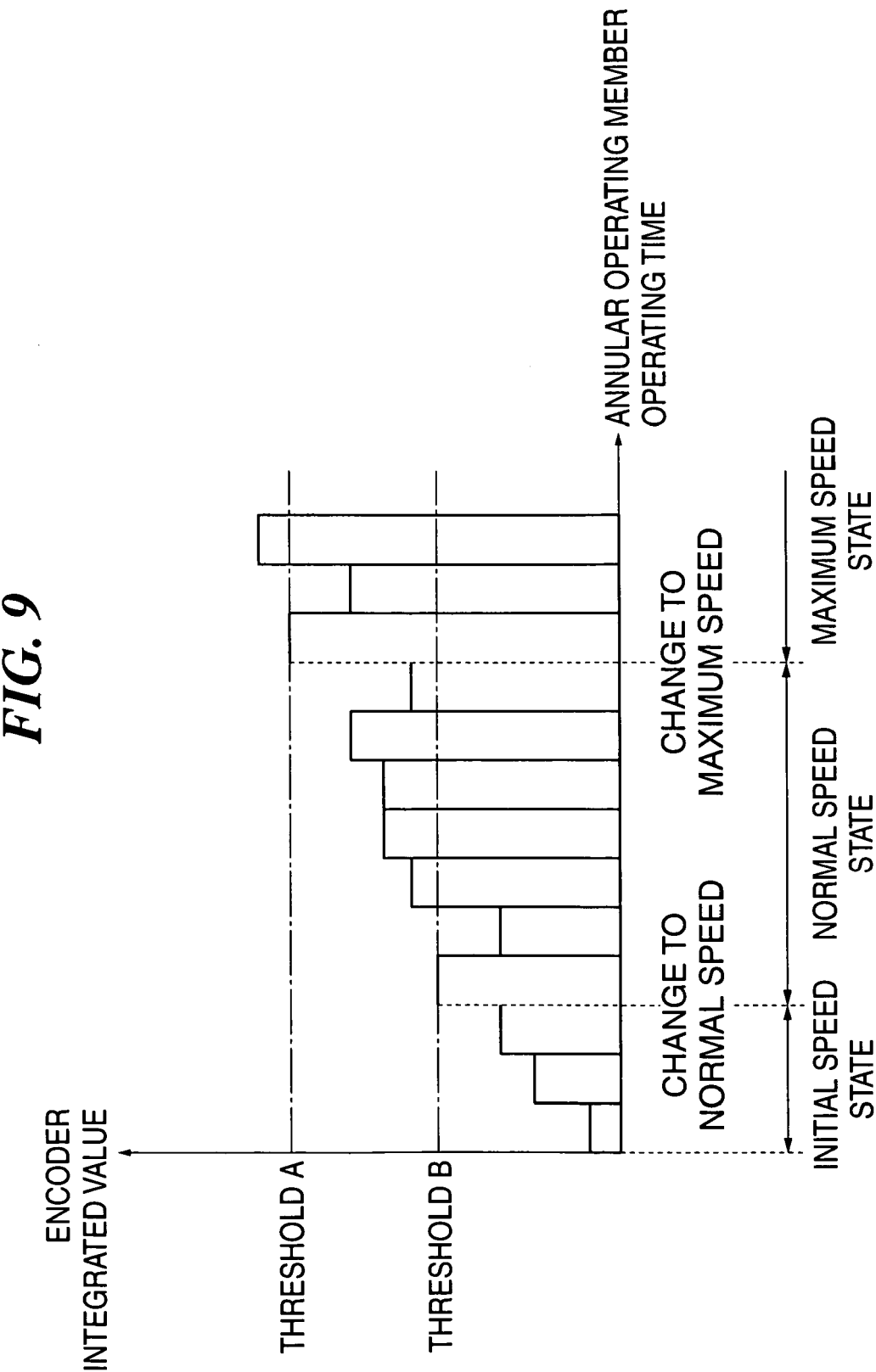

IMAGE PICKUP METHOD, IMAGE PICKUP APPARATUS, PROGRAM FOR IMPLEMENTING THE METHOD, AND STORAGE MEDIUM STORING THE PROGRAM

BACKGROUND OF THE INVENTION

1. Field of the Invention

The present invention relates to an image pickup method and an image pickup apparatus, that control the driving speed of an optical system of the image pickup apparatus based on information generated by an operating member thereof, and a program for implementing the method, and a storage medium storing the program.

2. Description of the Related Art

Conventionally, a technique for changing the driving speed of a zoom lens system (optical system) in response to the operating speed of an annular operating member (rotary operating member) disposed concentrically with the lens optical axis, so that effective zooming is performed in a manner matching the feeling of a human being (user) has been proposed in which the driving speed of the zoom lens system is determined by an exponential function based upon a sampled value obtained by sampling output from an encoder mounted on the operating member (see Japanese Laid-Open Patent Publication (Kokai) No. H10-39192).

However, according to the above prior art, the driving speed of the zoom lens system is set uniformly relative to the operating speed of the operating member by the exponential function, and therefore, with the technique according to the prior art, it is difficult to achieve operating feelings desired by a variety of users.

SUMMARY OF THE INVENTION

It is an object of the present invention to provide an image pickup method and an image pickup apparatus that are capable of achieving operating feelings desired by and providing an operability suited to user preference, and a program for implementing the method, and a storage medium storing the program.

To attain the above object, in a first aspect of the present invention, there is provided an image pickup method for an image pickup apparatus including an optical system having an optical axis, and an operating member disposed concentrically with the optical axis of the optical system, comprising a detection step of detecting a change rate in operating speed of the operating member, and a driving speed determining step of determining a driving speed of the optical system based on the change rate detected in the detecting step, using a variable that determines a correlation between a the change rate detected in the detection step and movement of the optical system.

To attain the above object, in a second aspect of the present invention, the is provided an image pickup apparatus comprising an optical system having an optical axis, an operating member disposed concentrically with the optical axis of the optical system, a detecting device that detects a change rate in operating speed of the operating member, and a driving speed determining device that determines a driving speed of the optical system based on the change rate detected by the detecting device using a variable that determines a correlation between the change rate detected by the detecting device and movement of the optical system.

Preferably, the variable that determines the correlation between the detected change rate in the operating speed of the operating member and the movement of the optical system comprises sampling intervals at which the change rate in the operating speed of the operating member is sampled.

Alternatively, the variable that determines the correlation between the detected change rate in the operating speed of the operating member and the movement of the optical system comprises the driving speed of the optical system.

Also alternatively, the variable that determines the correlation between the detected change rate in the operating speed of the operating member and the movement of the optical system comprises capability of the optical system to follow up the change rate in the operating speed of the operating member.

Also alternatively, the variable that determines the correlation between the detected change rate in the operating speed of the operating member and the movement of the optical system comprises a stop reaction sensitivity of the optical system corresponding to the driving speed of the optical system.

Alternatively, the variable that determines the correlation between the detected change rate in the operating speed of the operating member and the movement of the optical system comprises at least one selected from the group consisting of sampling intervals at which the change rate in the operating speed of the operating member is sampled, the driving speed of the optical system, capability of the optical system to follow up the change rate in the operating speed of the operating member, and a stop reaction sensitivity of the optical system corresponding to the driving speed of the optical system.

Also preferably, the image pickup apparatus comprises a selecting device that selects the variable that determines the correlation between the detected change rate in the operating speed of the operating member and the movement of the optical system.

Also preferably, the optical system comprises a zoom lens system.

Preferably, the operating member comprises a rotary operating member.

To attain the above object, in a third aspect of the present invention, there is provided a program for causing a computer to execute an image pickup method, comprising a detection module that detects a change rate in operating speed of an operating member disposed coaxially along the optical axis of an optical system, and a driving speed determining module that determines a driving speed of the optical system based on the detection result of the change rate by the detection module by using a variable that determines a correlation between the detection result of the change rate of the detection module and movement of the optical system.

To attain the above object, in a fourth aspect of the present invention, there is provided a computer-readable storage medium storing a program for causing a computer to execute an image pickup method for an image pickup apparatus including an optical system having an optical axis, and an operating member disposed concentrically with the optical axis of the optical system, the program comprising a detection module for detecting a change rate in operating speed of the operating member, and a driving speed determining module for determining a driving speed of the optical system based on the change rate detected by the detecting module, using a variable that determines a correlation between a the change rate detected by the detection module and movement of the optical system.

According to the present invention, it is possible to achieve an operability suited to user preference.

The above and other objects, features, and advantages of the invention will become more apparent from the following detailed description taken in conjunction with the accompanying drawings.

BRIEF DESCRIPTION OF THE DRAWINGS

FIG. 9 is a flow chart showing integrated values of output pulses from the operating member in the digital camera.

DETAILED DESCRIPTION OF THE PREFERRED EMBODIMENTS

The present invention will now be described in detail with reference to the drawings showing a preferred embodiment thereof.

Figure 1A:
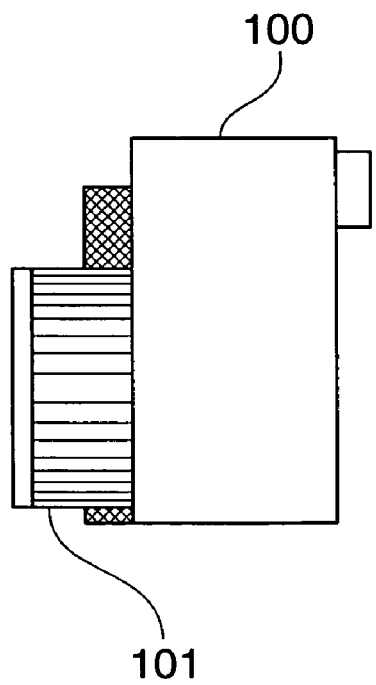
FIGS. 1A and 1B are block diagrams showing the construction of a digital camera as an image pickup apparatus according to a first embodiment of the present invention.
Figure 1B:
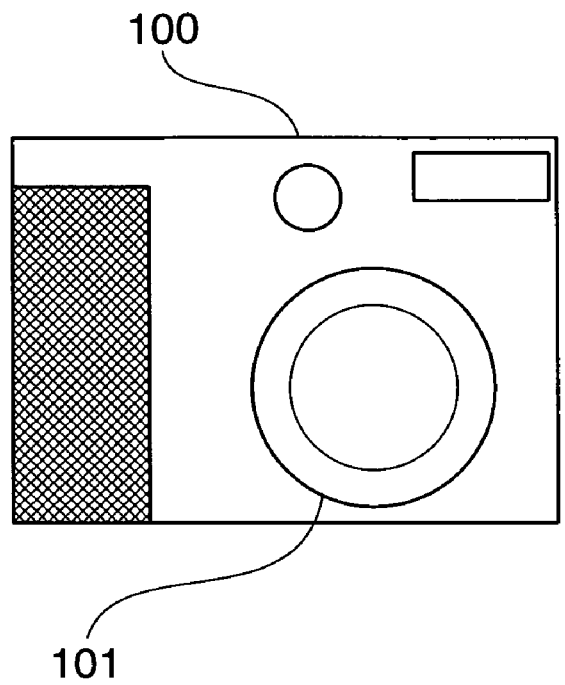

FIGS. 1A and 1B are block diagrams showing the construction of a digital camera as an image pickup apparatus according to an embodiment of the present invention.

The digital camera according to the present embodiment is constructed such that an annular operating member is operated to generate pulses, and the driving speed of a zoom lens system as an optical system is controlled based on information on the generated pulses.

In FIGS. 1A and 1B, reference numeral 100 designates a digital camera as an image pickup apparatus, and reference numeral 101 designates an annular operating member. The operating member 101 has a built-in pulse generating device, not shown. By rotating the operating member 101, the pulse generating device generates pulses. The frequency of the pulses generated by the pulse generating device varies according to a speed at which the operating member is rotated, and by sampling the frequency information on the generated pulses, the rotational speed of the operating member 101 can be detected.

Figure 2:
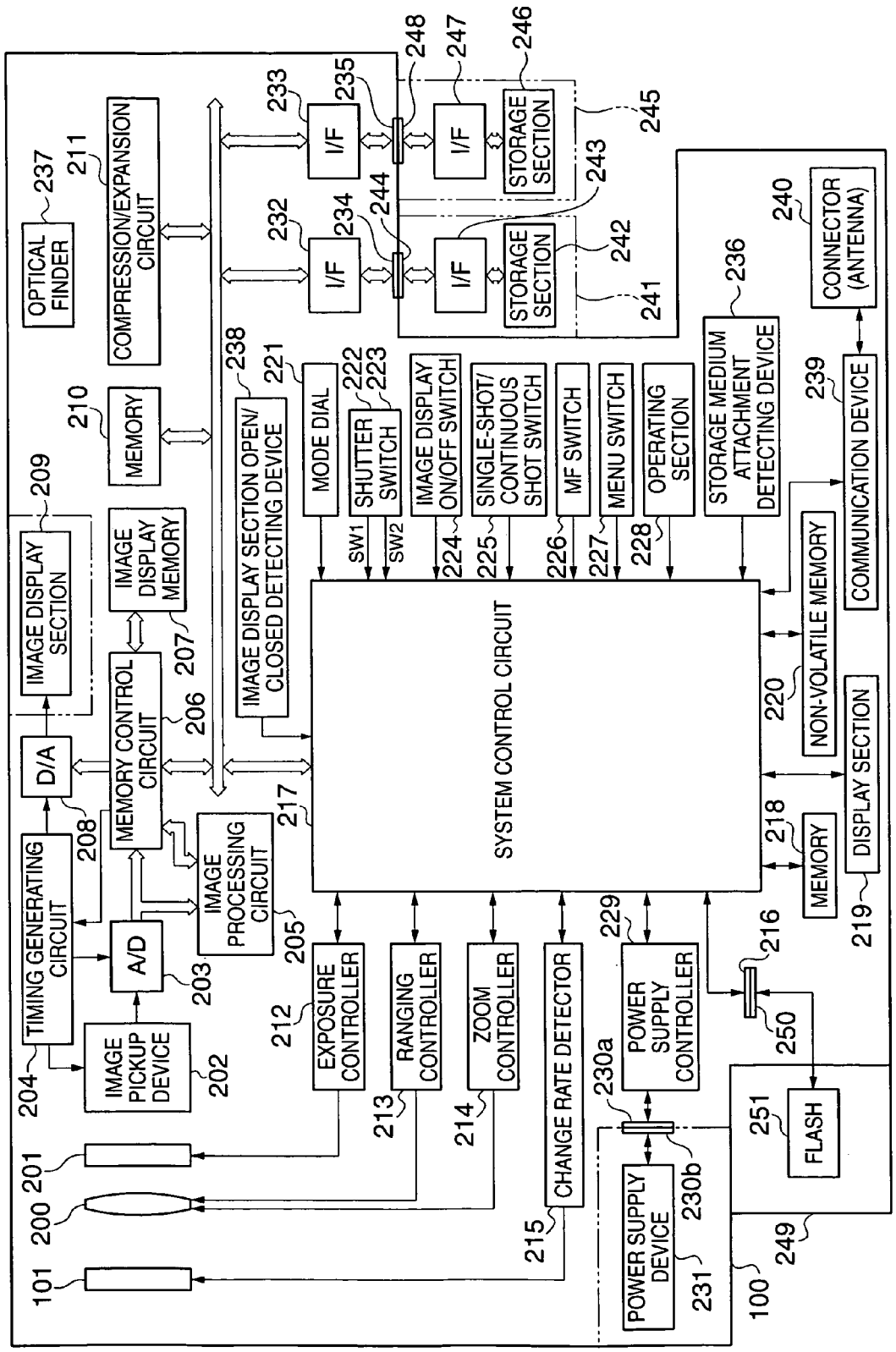
FIG. 2 is a block diagram showing the system configuration of the digital camera of FIGS. 1A and 1B.

FIG. 2 is a block diagram showing the system configuration of the digital camera 100.

In FIG. 2, reference numeral 100 designates the digital camera, 101 designates the operating member, 200 designates a taking lens (including a zoom lens system and a focus lens system) and 201 designates a shutter, provided with a stop function. Reference numeral 202 designates an image pickup device that converts an optical image into an electrical signal. Reference numeral 203 designates an A/D converter that converts an analog signal output from the image pickup device 202 into a digital signal. Reference numeral 204 designates a timing generating circuit that supplies a clock signal and control signals to the image pickup device 202, the A/D converter 203 and a D/A converter 208, described later, and is controlled by a memory control circuit 206 and a system control circuit 217, described later.

Reference numeral 205 designates an image processing circuit, which performs predetermined pixel interpolation processing and predetermined color conversion processing on data from the A/D converter 203 or data from the memory control circuit 206, using shot image data, and, based upon the results of the calculation processing, the system control circuit 217 controls an exposure controller 212 and a ranging controller 213, described later, to perform AF (Auto Focus) processing, AE (Auto Exposure) processing and EF (Evaluative Flash) process according to the TTL (Through The Lens) system. Moreover, the image processing circuit 205 performs predetermined calculation processing using the shot image data, and also performs AWB (Auto White Balance) processing according to the TTL system based on the results of the calculation processing.

Reference numeral 206 designates a memory control circuit, which controls the A/D converter 203, the timing generating circuit 204, and the image processing circuit 205 as well as an image display memory 207, the D/A converter 208, a memory 210, and a compression/expansion circuit 211, all described later. Data from the A/D converter 203 is written to the image display memory 207 or the memory 210, described later, either through the image processing circuit 205 and the memory control circuit 206 or directly through the memory control circuit 206.

Reference numeral 209 designates an image display section, which is comprised of a TFT LCD or the like. The display image data written to the image display memory 207 is displayed by the image display section 209 via the D/A converter 208. Sequentially displaying the shot image data using the image display section 209 makes it possible to implement an electronic finder function. Moreover, it is also possible to display a histogram created by the image processing circuit 205. The image display section 209 permits turning the display on and off as desired by an instruction from the system control circuit 217, described later. When the display is turned off, the power consumption of the digital camera 100 can be substantially reduced.

Furthermore, the image display section 209 is rotatably attached to the body of the digital camera 100 by a hinge and can be set to any orientation and angle, enabling use of the electronic finder function and reproduction display function as well as a variety of display functions at such orientation and angle. Moreover, the display section of the image display section 209 can be oriented toward and stored in the digital camera 100, in which case a stored state can be detected and a display operation of the image display section 209 can be stopped by an image display section open/closed state detecting device 238, described later.

The memory 210 stores shot still image data and moving image data and is provided with a storage capacity adequate to store a predetermined number of still images and moving images of a predetermined time extent. Therefore, it is possible to write a large amount of image data to the memory 210 at high speed when shooting a plurality of still images continuously in continuous shooting or in panorama shooting. Moreover, the memory 210 can also be used as a work area for the system control circuit 217. The compression/expansion circuit 211 compresses and decompresses image data using Adaptive Discrete Cosine Transform (ADCT) or the like, reads data stored in the memory 210 and compresses or decompresses the data, and writes the processed data to the memory 210.

The exposure controller 212 controls the shutter 201 having a diaphragm function. The exposure controller 212 cooperates with a flash 251, described later, to function as a flash modulation light control device. The ranging controller 213 controls the focusing of the focus lens system of the taking lens 200. The exposure controller 212 and the ranging controller 213 are controlled using the TTL system, such that the system control circuit 217 controls the exposure controller 212 and the ranging controller 213 based on the results of the calculations performed on the sensed shot image data by the image processing circuit 205. Reference numeral 214 designates a zoom controller which controls the zooming of the zoom lens system of the taking lens 200, 215 a change rate detecting device which detects pulses generated by operation of the operating member 101.

Reference numeral 216 designates a connector, also called an accessory shoe, which also functions as both a mechanical fixing device as well as an electrical connection for a flash device 249, described later. The system control circuit 217 controls the digital camera 100 as a whole. Reference numeral 218 designates a memory which stores constants, variables, programs and so forth for the operation of the system control circuit 217. Reference numeral 219 designates a display section which displays the operative state of the digital camera 100, messages and so forth in terms of text, images and/or audio in response to the execution of programs by the system control circuit 217. One or more display sections 219 are disposed at one or more locations near the operating section of the digital camera 100 that is easily visible, and may, for example, be implemented by a combination of a LCD (Liquid Crystal Display), a LED (Light Emitting Diode), a sounding device, and so forth. Moreover, a portion of the functional elements of the display section 219 is disposed within an optical finder 237, described later.

Of the display contents of the display section 219, contents which are displayed on the LCD or the like include single-shot/continuous shot image display, self-timer display, compression ratio display, recording pixel number display, recording frame number display, remaining frame number display, shutter speed display, diaphragm value display, exposure compensation display, flash display, red-eye reduction display, macro shooting display, buzzer setting display, remaining clock battery capacity display, remaining battery capacity display, error display, information display in multiple digits, attached/detached state display for storage media 241 and 245, described later, communications I/F (interface) operation display, date/time display, and so forth. Moreover, of the display contents of the display section 219, a contents which are displayed inside the optical finder 237, described later, include in-focus display, hand-shake warning display, flash charge display, shutter speed display, diaphragm value display, exposure compensation display, and so forth.

Reference numeral 220 designates an electrically erasable/writable non-volatile memory (storage device), which may be implemented by an EEPROM (Electronically Erasable and Programmable Read Only Memory), for example. The non-volatile memory 220 stores a table showing the relationship between a change rate in the repetition period of output pulses with a change in the rotational speed of the operating member 101 and the driving speed of the zoom lens system of the taking lens 200. The table can be rewritten by the user, and moreover, there may be a plurality of such tables. A description of the table will be given later, when describing a drive sequence.

Reference numerals 221, 222, 223, 224, 225, 226 and 227 designate operating elements or operators for inputting various operating instructions to the system control circuit 217, and are each a switch, a dial, a touch-panel, a pointing device for visual detection, or an audio recognition device, or a combination of two or more of them.

A detailed description will now be given of the operating elements 221 to 227.

The operating element 221 is a mode dial switch which can switch between a variety of functional modes such as power-off mode, automatic shooting mode, shooting mode, panorama shooting mode, reproduction mode, multi-screen reproduction/erasure mode, and PC (personal computer) connection mode.

The operating element 222 is a first shutter switch (SW1) which is turned on upon half depression of a shutter button, not shown, to cause start of operation of the AF (Auto Focus) processing, the AE (Auto Exposure) processing, the AWB (Auto White Balance) processing or the EF (Evaluative Flash) processing.

The operating element 223 is a second shutter switch (SW2) which is turned on upon completion of the depression of the shutter button, to cause start of operation of a series of processing involving exposure processing of writing signals read from the image pickup device 202 to the memory 210 as image data via the A/D converter 203 and the memory control circuit 206, developing processing using calculations performed by the image processing circuit 205 and the memory control circuit 206, compression processing of reading image data from the memory 210 and compressing the same at the compression/expansion circuit 211, and recording processing of writing the image data to the storage medium 241 or 245, described later.

The operating element 224 is an image display on/off switch which can set the image display section 209 to be turned on and off. This function makes it possible to save electric power consumption by interrupting the supply of current to the image display section 209 composed of a TFT LCD or the like when performing shooting using the optical finder 238, described later The operating element 225 is a single shot/continuous shot switch which selectively sets a single-shot mode in which an image is shot in one frame upon operation of the second shutter switch (SW2) 223, and then the camera shifts into a standby state, and a continuous shooting mode in which shooting is continuously performed while the second shutter switch (SW2) 223 is operated.

The operating element 226 is a MF (Manual Focus) switch which sets a manual focus mode in which the user operates the focus lens system of the taking lens 200 and performs focusing.

The operating element 227 is a menu switch. By operating the menu switch 227, a menu screen is displayed on the display section 219, and the user can switch various functions on and off, and select shooting setting parameters. The user can also select an operability parameter table, described later, on the menu screen.

Reference numeral 228 designates an operating section comprised of a variety of buttons, switches, touch panels and so forth. Specifically, the operation section 228 includes a menu button, a set button, a cancel button, a macro button, a multi-screen reproduction next-page button, a flash setting button, a single-shot/continuous shot/self timer switching button, a menu shift forward (+) button, a menu shift back (−) button, a reproduction image shift forward (+) button, a reproduction image shift back (−) button, a shot image quality selection button, an exposure compensation button, a date/time setting button, a selection/switching button that sets a selection or a switching of a variety of functions when executing image shooting or reproduction in a panorama mode, etc., a determination/execution button that sets determination and execution of a variety of functions when executing image shooting and reproduction in the panorama mode, etc., an image display on/off switch that sets the image display section 209 on or off, a quick review on/off switch that sets a quick review function that automatically reproduces shot image data immediately after shooting on or off, a compression mode switch that selects a JPEG compression ratio or selects a CCDRAW mode in which signals from the image pickup device 202 are digitized as they are and recorded to the storage medium 241 or 245, described later, a reproduction mode switch that sets the reproduction mode, the multi-screen reproduction/erasure mode, the PC connection mode, etc., and a reproduction switch that causes start of a reproduction operation of reading out data of image shot in the shooting mode from either the memory 210 or the storage medium 241 or 245, described later, and displays the image using the image display section 209.

Reference numeral 229 designates a power supply controller and is comprised of a battery detection circuit, a DC-DC converter, and a switching circuit that switches a block to be powered. The power supply controller 229 performs such detection processing as detecting the installation of a battery, the type of the battery, and the remaining battery capacity, and controls the DC-DC converter based on the results of the detection as well as on instructions from the system control circuit 217, and supplies a required voltage for a required period of time to various sections, including the storage medium 241 or 245. Reference numerals 230a and 230b designate connectors, and 231 designates a power supply device. The power supply device 231 is comprised of a primary battery, such as an alkaline battery or a lithium battery, a secondary battery, such as a NiCd battery or a NiMH battery, or an AC adapter or the like.

Reference numerals 232 and 233 designate interfaces (I/F) for a storage medium such as a memory card or a hard disk. Reference numerals 234 and 235 designate connectors that connect to the storage medium such as a memory card or a hard disk. Reference numeral 236 designates a storage medium attachment detecting device, which detects whether or not the storage medium 241 or 245, described later, is attached to the connectors 234 and 235.

Although in the present embodiment, it is assumed that there are two connection systems comprised of interfaces and connectors to which the storage medium 241 or 245 are attached, the present invention is not limited to such an arrangement and may be configured so as to have either one connection system or a plurality of connection systems. Moreover, the connection systems may be different from each other, that is, involving a plurality of combinations of interfaces and connectors of different specifications. The interfaces and connectors may comply with standards such as those of PCMCIA cards or CF ((Compact Flash) registered trademark) cards. Furthermore, where the interfaces 232, 233 and the connectors 234, 235 comply with standards such as those of PCMCIA cards or CF cards, by connecting a variety of communication cards such as a LAN card, a modem card, a USB card, an IEEE1394 card, a P1284 card, a SCSI card or a PHS, the image pickup apparatus can exchange image data and management information attached to the image data with peripheral devices such as other computers and printers.

The optical finder 237 enables the user to pick up images using only the optical finder 237, without using the electronic finder function of the image display section 209. Moreover, the optical finder 237 is provided with a portion of the display section 219 functions, for example, the in-focus display function, the hand-shake warning display function, the flash charge display function, the shutter speed display function, the stop value display function, and the exposure compensation display function.

The image display section open/closed detecting device 238 detects whether or not the image display section 209 is in a state in which it is stored within the body of the digital camera 100. When detecting that the image display section 209 is in the stored state, the image display section open/closed detecting device 238 halts the operation of the image display section 209, thus making possible prevention of unnecessary power consumption.

Reference numeral 239 designates a communication device which is comprised of a variety of communication functions such as RS232C, USB, IEEE1394, a P1284, SCSI, modem, and LAN or wireless communications. Reference numeral 240 designates a connecting section. The connection section 240 is a connector which is used to connect the digital camera 100 to another apparatus by the communication device 239. When the other apparatus is a wireless communication apparatus, the connection section 240 is an antenna. The recording medium 241 is a first storage medium, such as a memory card or a hard disk. The first storage medium 241 is comprised of a storage section 242 composed of a semiconductor memory, a magnetic disk or the like, an interface (I/F) 243 for the digital camera 100, and a connector 244 that connects the digital camera 100 and the storage section 242 to each other.

The recording medium 245 is a second storage medium, such as a memory card or a hard disk. The second storage medium 245 is comprised of a storage section 246 composed of a semiconductor memory, a magnetic disk or the like, an interface (I/F) 247 for the digital camera 100, and a connector 248 that connects the digital camera 100 and the storage section 246 to each other. Reference numeral 250 designates a connector, which connects to the accessory shoe 216 of the digital camera 100. The flash 251 is provided in the flash device 249, and is equipped with an AF auxiliary flash function and a flash light control function.

Next, a description will be given of an operation process of the zoom lens system of the taking lens 200 by the operating member 101 of the digital camera 100, with reference to FIGS. 3 through 7.

FIGS. 3 to 6 are flow charts showing the flow of the operating process of the zoom lens system of the taking lens 200 by the operating member 100 of the digital camera 100.

Figure 3:
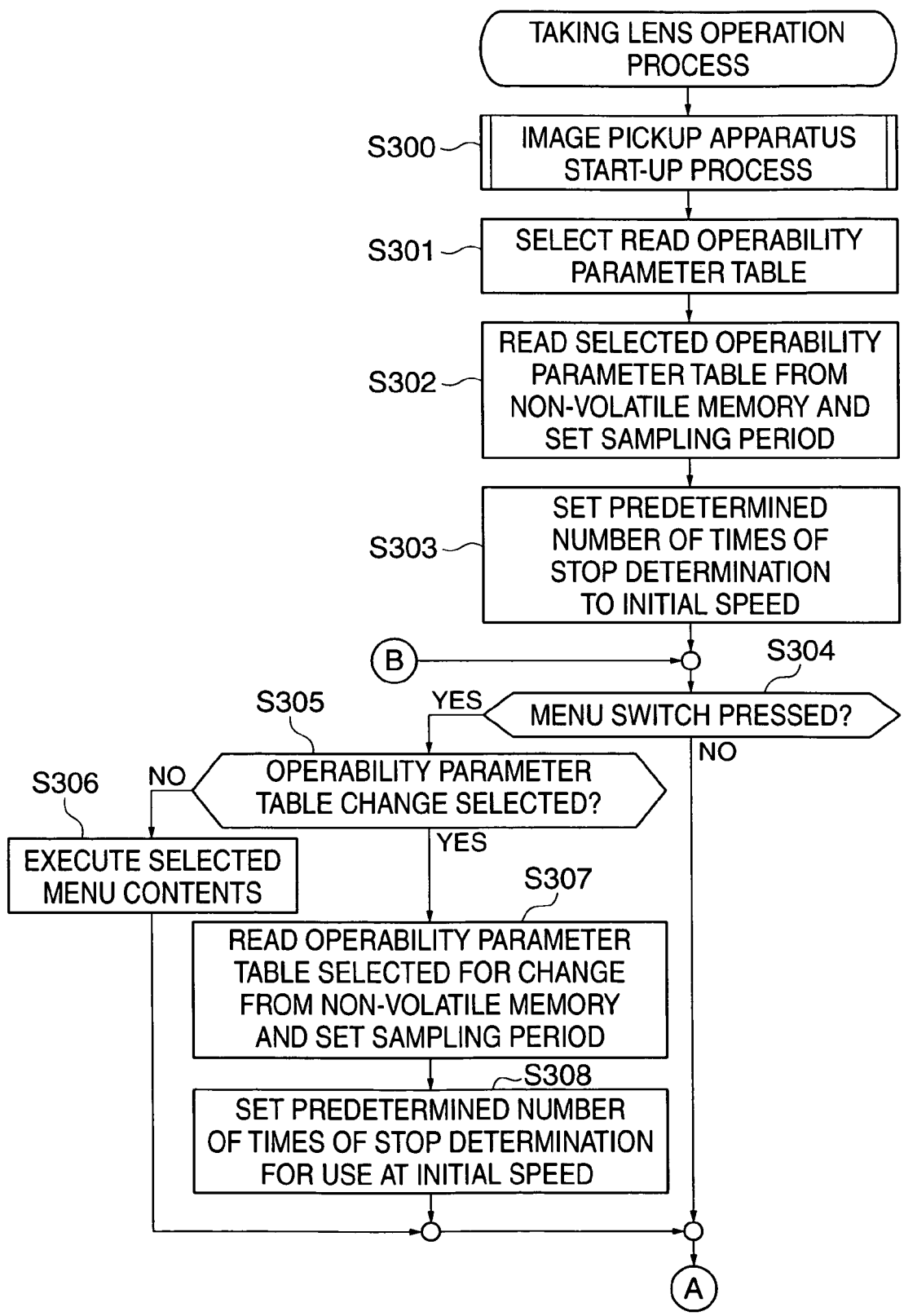
FIG. 3 is a flow chart showing an operation process of the digital camera.

First, as shown in FIG. 3, a start-up process for the digital camera 100 is executed in a step S300. The digital camera 100 start-up process in the step S300 will be described in detail later with reference to FIG. 7.

Next, in a step S301, one operability parameter table is selected from among the plurality of operability parameter tables stored in the non-volatile memory 220. The method of selecting the operability parameter table is such that the operability parameter table is automatically selected according to the type of shooting mode or the operability parameter table that was selected by the user last is selected. Where the operability parameter table is selected automatically according to the type of shooting mode, then, for example, when the shooting mode is the moving image shooting mode, sudden changes in the angle of view are undesirable, and therefore a parameter is selected such that the driving speed of the zoom lens system changes slowly as the rotational speed of the operating member 101 changes. Written in the operability parameter table are a sampling period with which pulses are integrated, described later, threshold values A and B, initial speed/normal speed/maximum speed information (that is, the number of pulses per second (PPS) or the number of rotations per minute (RPM)), a number of times of determination of stop (optical system stop reaction sensitive) at each speed, and so forth. The driving speed of the zoom lens system of the taking lens 200 is determined by reference to the operability parameter table. The operability of the zoom lens system of the taking lens 200 is determined by the information in the non-volatile memory 220.

In the present embodiment, there are a plurality of operability parameter tables. However, there may be only one operability parameter table. Of the parameters of the operability parameter table, the user may arbitrarily set the sampling period, the threshold values, the normal speed information, and the number of times of determination of stop at each speed.

With respect to the speed information parameter setting, however, because it depends on the mechanical elements of the taking lens 200 of the zoom lens system, the speed information parameter cannot be set to a value greater than the maximum possible driving speed of the zoom lens system of the taking lens 200 or less than the minimum possible driving speed of the taking lens 200 of the zoom lens system. In other words, the speed information parameter can be set to any speed within a range from not more than the maximum driving speed of the zoom lens system of the taking lens 200 to not less than the minimum driving speed of the zoom lens system of the taking lens 200.

The method of changing the parameters includes, for example, a method of setting the parameters from an external input device such as a personal computer, and a method of downloading an operability parameter table from a server on a network and writing the table to the non-volatile memory 220 or the like.

When the processing of the step S301 described above is completed, in a step S302 the operability parameter table selected in the step S301 is read from the non-volatile memory 220 and the sampling period is set. Next, in a step S303, a predetermined number of times of determination that the operation of the operating member 101 has stopped is set for the initial driving speed.

Next, in a step S304, it is determined whether or not the menu switch 227 has been operated. If it is determined that the menu switch 227 has been operated, then the process proceeds to a step S305. If it is determined that the menu switch has not been operated, then the process proceeds to a step S309 shown in FIG. 4.

In the step S305, it is determined whether or not operability parameter table change has been selected in the menu screen displayed by the operation of the menu switch 227. If it is determined that operability parameter table change has not been selected, then the process proceeds to a step S306, where processing is performed in accordance with another menu item selected in the displayed menu screen, after which the process proceeds to the step S309 in FIG. 4.

On the other hand, if it is determined in the step S305 that operability parameter table change has been selected, then the process proceeds to a step S307, where an operability parameter table selected as a new operability parameter table is read from the non-volatile memory 220, and the sampling period written in the read operability parameter table, with which pulses outputted from the operating member 101 are integrated, is changed. Next, in a step S308, the predetermined number of times of determination that the operation of the operating member 101 at the initial speed has stopped is set to a value written in the operability parameter table, after which the process proceeds to the step S309 in FIG. 4.

Figure 4:
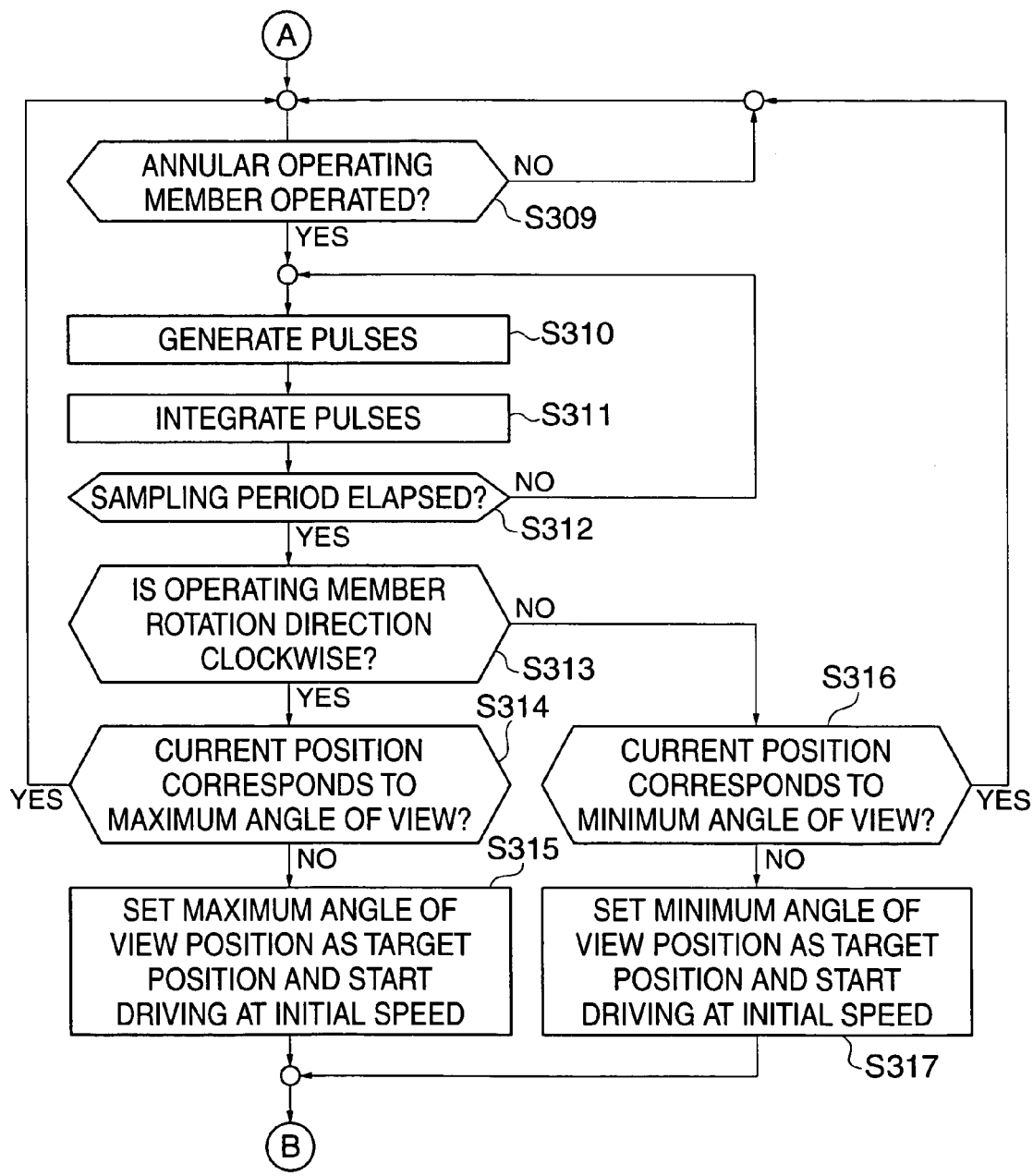
FIG. 4 is a continuation of the flow chart of FIG. 3.
Figure 8:
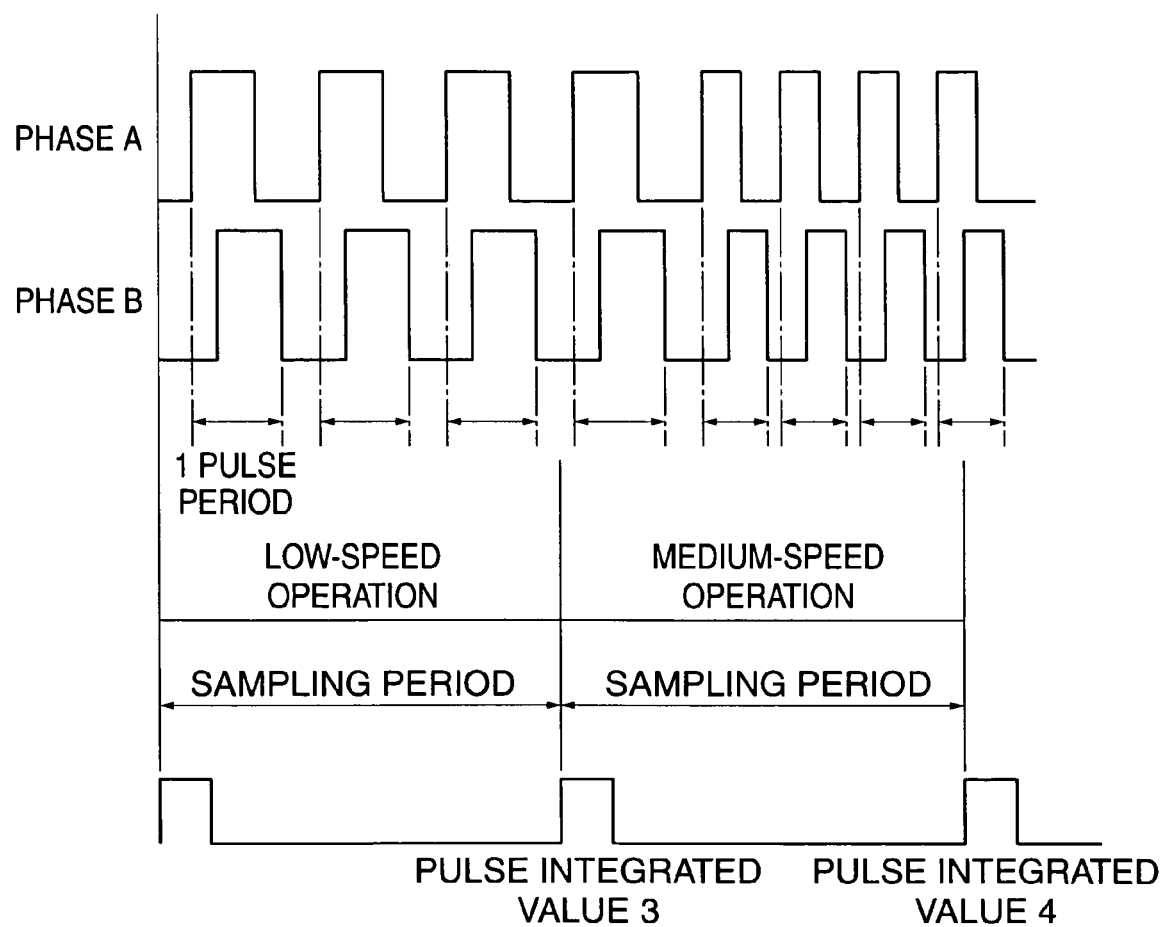
FIG. 8 is a diagram showing output pulses from an operating member of the digital camera.

In the step S309 in FIG. 4, the change rate detector 215 detects whether or not the operating member 101 has been operated, until the operating member 101 is operated. Then, if it is detected that the operating member 101 has been operated, the process proceeds to a step S310, where pulses are generated by the pulse generating device built in the operating member 101. The generated pulses are pulses of phases A and B as shown in FIG. 8, referred to later.

Next, the process proceeds to a step S311, where the pulses generated in the step S310, are integrated. This pulse integrating process is continued for the sampling period set in the step S302. Next, the process proceeds to a step S312, where it is determined whether or not the sampling period has elapsed. Then, if it is determined that the sampling period has not elapsed, the process returns to the step S310. If it is determined that the sampling period has elapsed, then the process proceeds to a step S313.

In the step S313, from the integrated value of the pulses integrated in the step S311, the direction of rotation and driving state of the operating member 101 are determined. In other words, information relating to the direction of rotation of the operating member 101 is included in the integrated value of the pulses, and the direction of rotation of the operating member 101 is determined based on the information relating to the direction of rotation. For example, if the direction of rotation of the operating member 101 is clockwise as viewed from the user, the integrated value of the pulses is a positive "+" value, and if the direction of rotation of the operating member 101 is counter-clockwise as viewed from the user, then the integrated value of the pulses is a negative "−" value. The direction of rotation of the operating member 101 is determined based on the positive/negative sign of the integrated value of the pulses.

The direction of rotation of the operating member 101 is detected in the step S313 based on the information relating to the integrated value. Then, if it is determined that the operating member 101 has been rotated clockwise as viewed from the user, the process proceeds to a step S314. If it is determined that the operating member 101 is rotated counter-clockwise as viewed from the user, the process proceeds to a step S316.

In the step S314, it is determined whether or not the current position of the zoom lens system of the taking lens 200 corresponds to the maximum angle of view position. If it is determined that the current position of the zoom lens system of the taking lens 200 corresponds to the maximum angle of view position, then driving of the zoom lens system is not performed and the process returns to the operating member detection processing of the step S309.

Figure 5:
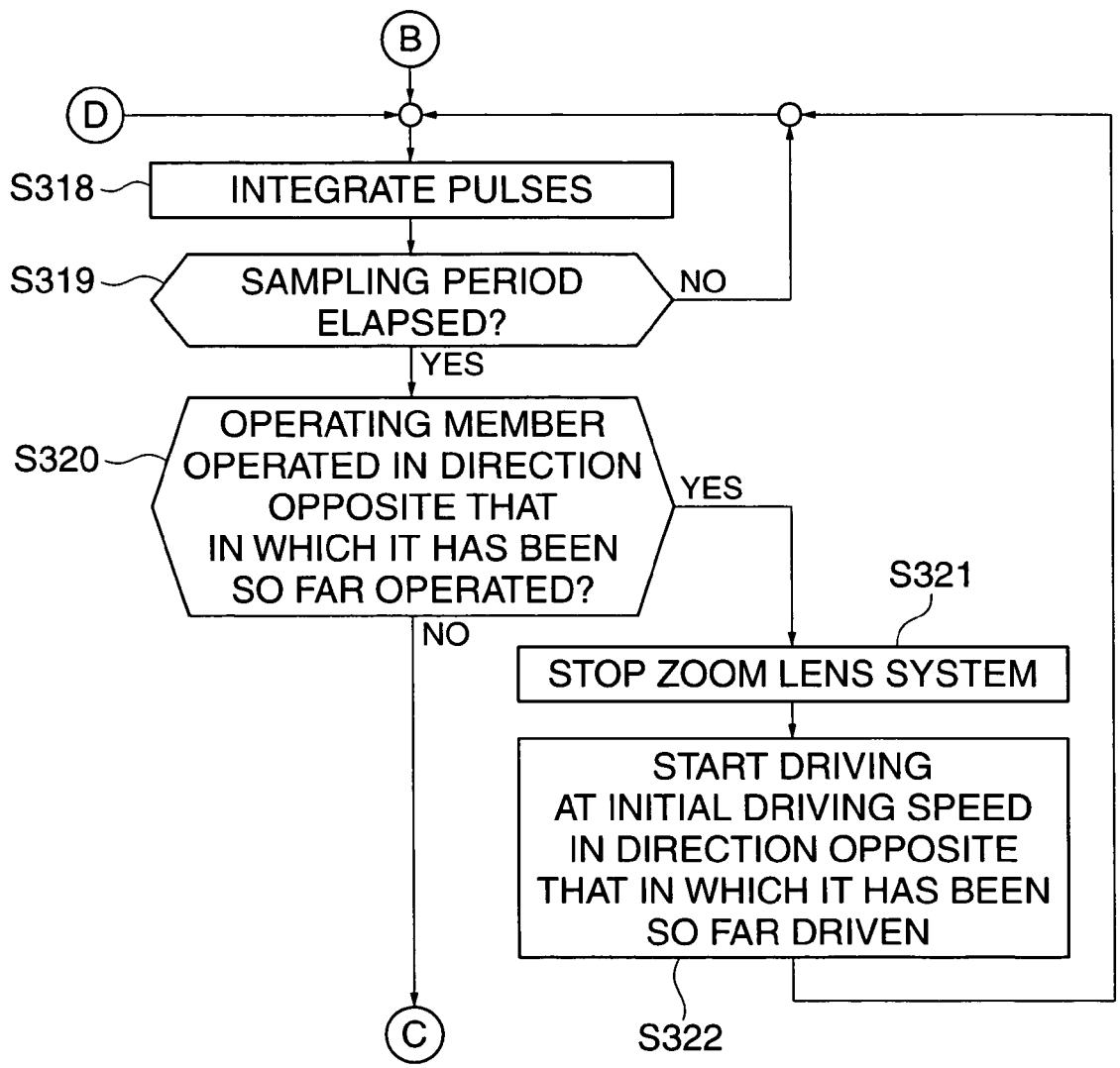
FIG. 5 is a continuation of the flow chart of FIG. 3.

Moreover, if it is determined in the step S314 that the current position of the zoom lens system of the taking lens 200 does not correspond to the maximum angle of view position, then the process proceeds to a step S315, where the maximum angle of view is set as a target position, and driving of the zoom lens system at the initial speed is started, after which the process proceeds to a step S318 shown in FIG. 5.

In the step S316, it is determined whether or not the current position of the zoom lens system of the taking lens 200 corresponds to the minimum angle of view position. Then, if it is determined that the zoom lens system of the taking lens 200 current position corresponds to the minimum angle of view position, then driving of the zoom lens system is not performed and the process returns to the operating member detection processing of the step S309.

If it is determined in the step S316 that the current position of the zoom lens system of the taking lens 200 does not correspond to the minimum angle of view position, then the process proceeds to a step S317, where the minimum angle of view is set as a target position, and driving of the zoom lens system at the initial speed is started, after which the process proceeds to the step S318 shown in FIG. 5.

In the present embodiment, the zoom lens system of the taking lens 200 is driven is driven in a direction in which the angle of view increases when the operating member 101 is rotated clockwise as viewed from the user, and is driven in a direction in which the angle of view decreases when the operating member 101 is rotated counter-clockwise as viewed from the user. However, the present invention also contemplates an arrangement in which the zoom lens system of the taking lens 200 is driven in a direction in which the angle of view decreases when the operating member 101 is rotated clockwise as viewed from the user, and is driven in a direction in which the angle of view increases when the operating member 101 is rotated counter-clockwise as viewed from the user.

In the step S318 in FIG. 5, a process of integrating the pulses generated by the pulse generating device built in the operating member 101 is executed. The integrating process is continued for the sampling period. Next, the process proceeds to a step S319, where it is determined whether or not the sampling period for the present integrating process has elapsed. If it is determined that the sampling period has not elapsed, then the process returns to the step S318. If it is determined that the sampling period has elapsed, then the process proceeds to a step S320.

In the step S320, after driving of the zoom lens system of the taking lens 200 has started, it is determined whether or not the operating member 101 has been rotated in a direction opposite to the direction in which the operating member 101 has been so far rotated. If it is determined that the operating member 101 has been rotated in a direction opposite to the direction in which the operating member 101 has been so far rotated, then the process proceeds to a step S321. If it is determined that the operating member 101 has not been rotated in a direction opposite to the direction in which the operating member 101 has been so far rotated, then the process proceeds to a step S323 in FIG. 6.

In the step S321, the driving of the zoom lens system of the taking lens 200 is immediately stopped, and then, in a step S322, driving of the zoom lens system of the taking lens 200 is started at the initial speed and in a direction corresponding to the direction in which the operating member 101 is being operated, after which the process returns to the step S318.

A plurality of predetermined values of the speed at which the zoom lens system of the taking lens 200 is driven are set in advance. In the present embodiment, there are provided three predetermined values of speed, i.e. initial speed, normal speed, and maximum speed, where initial speed<normal speed<maximum speed. The maximum speed is the maximum speed at which the zoom lens system of the taking lens 200 can be driven. The initial speed can be set to the minimum speed at which the zoom lens system of the taking lens 200 can be driven. The intermediate normal speed can be set to an arbitrary speed insofar as it is intermediate between the maximum speed and the minimum speed.

As shown in FIG. 8, when the operating member 101 is rotated at a low speed, the integrated value of pulses then generated in the interval of each sampling period is small, and as the operating member 101 rotational speed is increased, the integrated value of pulses then generated increases. Since the operating member 101 is manually operated by the user, the pulse integrated values show unevenness, as shown in FIG. 9.

To deal with this, as shown in FIG. 9, once the operating speed of the operating member 101 has been detected to fall in one of the above predetermined speed ranges, i.e. initial speed, normal speed, and maximum speed, change between these speed ranges is not carried out insofar as the pulse integrated value does not exceed or drop below the threshold value A or V As shown in FIG. 9, the threshold value A lies between the maximum speed and the normal speed, and the threshold value B lies between the normal speed and the initial speed. For example, when the pulse integrated value detected is greater than the threshold value B in an initial speed state of the operating member 101, the speed at which the zoom lens system of the taking lens 200 is driven is changed to the normal speed. When the pulse integrated value detected is greater than the threshold value A in a normal, speed state of the operating member 101, the speed at which the zoom lens system of the taking lens 200 is driven is changed to the maximum speed.

Figure 6:
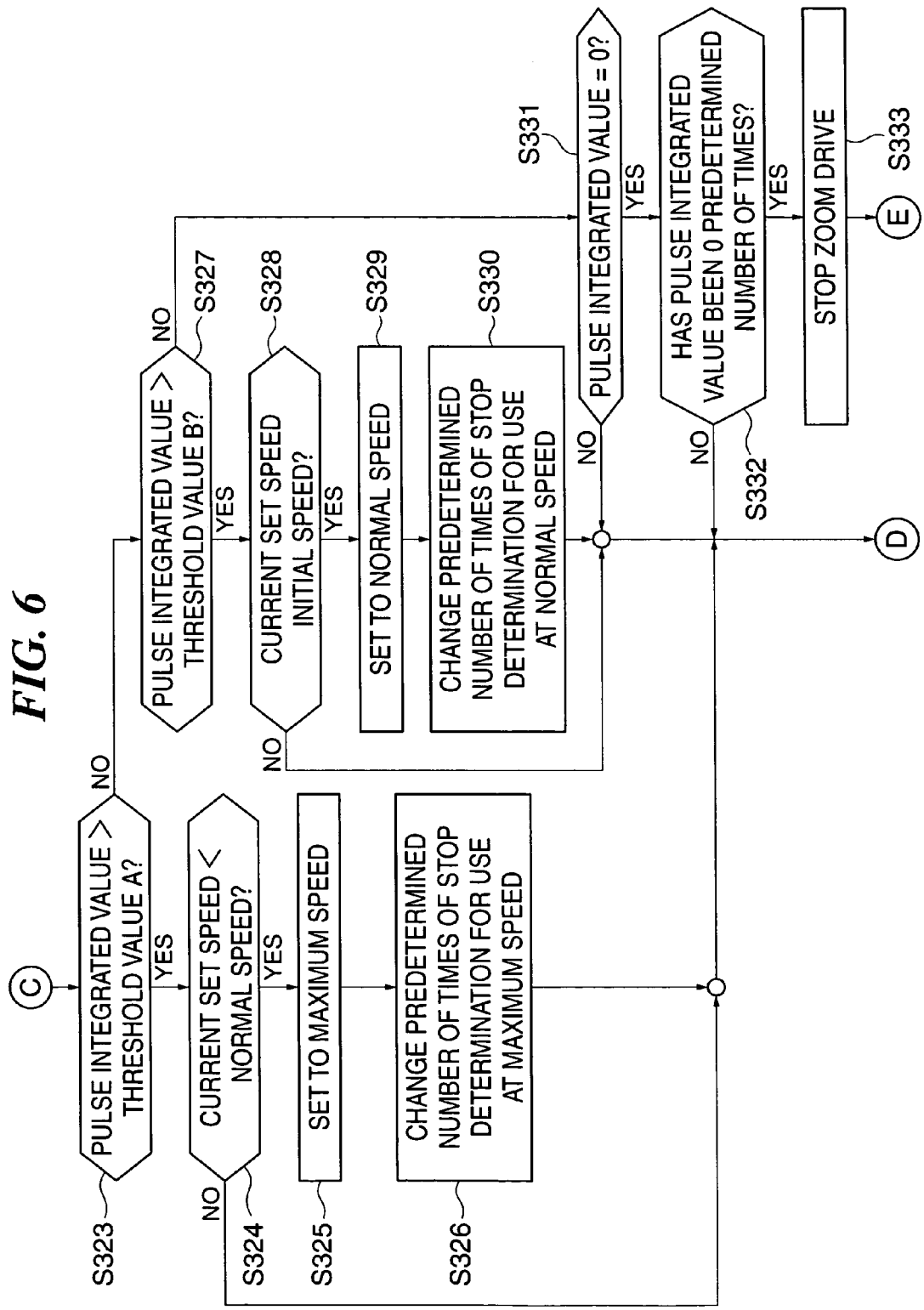
FIG. 6 is a continuation of the flow chart of FIG. 3.

The speed change sequence will now be described with reference to FIG. 6. First, in the step S323, it is determined whether or not the pulse integrated value is greater than the threshold value A. Then, if it is determined that the pulse integrated value is greater than the threshold value A, the process proceeds to a step S324, where it is determined whether or not the currently set speed at which the zoom lens system of the taking lens 200 is driven is less than the normal speed. Then, if it is determined that the currently set speed at which the zoom lens system of the taking lens 200 is driven is less than the normal speed, the process proceeds to a step S325, where the driving speed of the zoom lens system is set to the maximum speed, and, in the next step S326, the predetermined number of times of a determination that the operation of rotating the operating member 101 has stopped, which is executed in a step S332, described later, is changed to a value used when driving the zoom lens system at the maximum speed. Thereafter, the process returns to the pulse integration routine of the step S318 shown in FIG. 5.

On the other hand, if it is determined in the step S324 that the currently set speed at which the zoom lens system of the taking lens 200 is driven is greater than the normal speed, then the process proceeds to the pulse integration routine of the step S318 shown in FIG. 5 without further processing.

By contrast, if it is determined in the step S323 that the pulse integrated value is not greater than the threshold value A, then the process proceeds to a step S327, where it is determined whether or not the pulse integrated value is greater than the threshold value B. If the pulse integrated value is greater than the threshold value B, then the process proceeds to a step S328, where it is determined whether or not the currently set speed at which the zoom lens system of the taking lens 200 is driven is the initial speed. If it is determined that the currently set speed at which the zoom lens system of the taking lens 200 is driven is the initial speed, then the process proceeds to a step S329, where the speed at which the zoom lens system is driven is set to the normal speed, and in the next step S330 the predetermined number of times of the determination that the operation of rotating the operating member 101 has stopped in the step S332 is changed to a value used when driving the zoom lens system at the normal speed. Thereafter, the process returns to the pulse integration routine of the step S318 shown in FIG. 5. On the other hand, if it is determined in the step S328 that the currently set speed at which the zoom lens system of the taking lens 200 is driven is not the initial speed, then the process returns to the pulse integration routine of the step S318 shown in FIG. 5 without further processing.

By contrast, if On the other hand, if it is determined in the step S327 that the pulse integrated value is not greater than the threshold value B, then the process proceeds to a step S331, where it is determined whether or not the pulse integrated value is 0. If it is determined in the step S331 that the pulse integrated value is 0, then the process proceeds to the step S332, where it is determined whether or not the pulse integrated value has continuously been 0 the predetermined number of times as the optical system stop reaction sensitivity. If, in the step S332, the pulse integrated value has continuously been 0 the predetermined number of times, then the process proceeds to a step S333, where driving of the zoom lens system of the taking lens 200 is stopped and thereafter, the process returns to the step S304 shown in FIG. 3.

In this way, a time period until driving of the zoom lens system is stopped after the rotation of the operating member 101 is stopped can be set according to the current driving speed of the zoom lens system of the taking lens 200, thus enabling more precise control of the driving of the zoom lens system by the operating member 101 and achieving operability of the operating member 101 that satisfies user desire.

By contrast, if it is determined in the step S332 that the pulse integrated value has not continuously been 0 the predetermined number of times, then the process returns to the pulse integration routine of the step S318 shown in FIG. 5 without further processing.

Next, a description will be given of the start-up process for the digital camera 100 in the step S300 shown in FIG. 3, based on FIG. 7.

Figure 7:
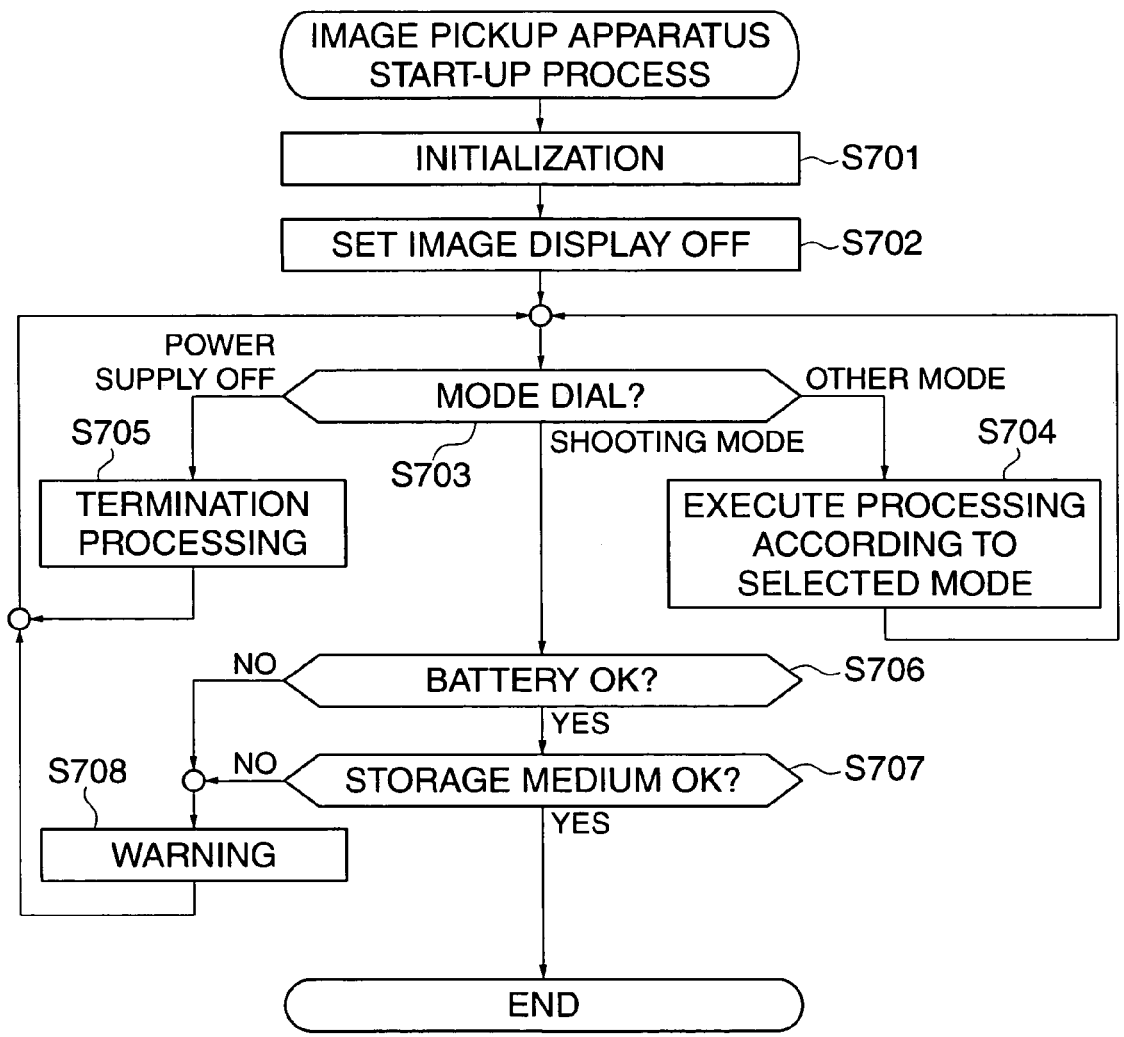
FIG. 7 is a flow chart showing a start-up process for the digital camera.

FIG. 7 is a flow chart of a start-up process for the digital camera 100 in the step S300 in FIG. 3.

When power is supplied, a step S701 is executed, where the system control circuit 217 initializes flags, control variables and so forth, and in the next step S702 the image display of the image display section 209 is initially set into an off state.

In the next step S703, the system control circuit 217 determines the setting position of the mode dial 221. If the system control circuit 217 determines that the mode dial 221 is set to some other mode, that is, a mode other than power-off mode and shooting mode, then the process proceeds to a step S704. If the system control circuit 217 determines that the mode dial 221 is set to the power-off mode, then the process proceeds to a step S705. On the other hand, if the system control circuit 217 determines that the mode dial 221 is set to the shooting mode, then the process proceeds to a step S706.

In the step S704, the system control circuit 217, executes processing according to the selected mode, and the process returns to the step S703.

In the step S705, the system control circuit 217 executes predetermined termination processing, such as stopping the display of the display section 219, closing a barrier of the operating member 101 to protect the image pickup section, recording necessary parameters including flags, control variables, and the like, setting values, and setting modes, in the non-volatile memory 220, and shutting off unneeded power to parts of the digital camera 100 including the image display section 209 using the power supply controller 229, after which the process returns to the step S703.

Furthermore, in the step S706, the system control circuit 217 causes the power supply controller 229 to determine whether or not the remaining capacity and operating state of the power supply device 231 comprised of a battery for example poses a problem for the operation of the digital camera 100 (i.e., whether or not there is a problem with the power supply device 231). If it is determined that there is a problem with the power supply device 231, then the process proceeds to a step S708, where the system control circuit 217 carries out a predetermined warning display by means of images or sound using the display section 219, after which the process returns to the step S703. Moreover, if it is determined in the step S706 that there is no problem with the power supply device 231, then the process proceeds to a step S707, where the system control circuit 217 determines whether or not the operating state of the storage medium 241 or 245 poses a problem for the operation of the digital camera 100, in particular, the operations of recording image data to and reproducing image data from the storage medium 241 or 245. Then, if the system control circuit 217 determines that there is a problem for the recording and reproduction operations, the process proceeds to the step S708, where the system control circuit 217 carries out a predetermined warning display by means of images or sound using the display section 219, after which the process returns to the step S703.

If it is determined in the step S707 that there is no problem with the operating state of the storage medium 241 or 245, then the startup process for the digital camera 100 is terminated.

The present invention is not limited to the embodiment described above but can be applied to any configuration that achieves the functions recited in the appended claims or the functions provided by the configuration of the above described embodiment.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-024408 filed Jan. 30, 2004, which is hereby incorporated by reference herein.

What is claimed is:

1. An image pickup method for an image pickup apparatus including an optical system having an optical axis, and an operating member disposed concentrically with the optical axis of the optical system, comprising:

a selection step of permitting a menu screen to be displayed on a display section and permitting a user, using the menu screen, to select one table from a plurality of user selectable tables that each provide a sampling period of a change rate in operating speed of the operating member;

a detection step of detecting a change rate in operating speed of the operating member by counting pulses generated when operating the operating member and integrating the counted pulses with the sampling period provided by the selected one table;

a driving speed determining step of determining a driving speed of the optical system based on the change rate in operating speed of the operating member detected in said detecting step and the selected one table; and a driving speed actuating step of actuating the optical system according to the driving speed determined in the driving speed determining step.

2. An image pickup apparatus comprising:

an optical system having an optical axis;

an operating member disposed concentrically with the optical axis of said optical system;

a menu switch that permits a menu screen to be displayed on a display section and permits a user, using the menu screen, to select one table from a plurality of user selectable tables that each provide a sampling period of a change rate in operating speed of the operating member;

a detecting device that detects a change rate in operating speed of said operating member by counting pulses generated when operating the operating member and integrating the counted pulses with the sampling period provided by the selected one table;

a driving speed determining device that determines a driving speed of said optical system based on the change rate in the operating speed of the operating member detected by said detecting device and the selected one table; and a driving speed controlling device that controls the optical system according to the driving speed determined by the driving speed determining device.

3. An image pickup apparatus according to claim 2, wherein the user selectable tables include sampling intervals at which the change rate in the operating speed of said operating member is sampled.

4. An image pickup apparatus according to claim 2, wherein the user selectable tables include the driving speed of said optical system.

5. An image pickup apparatus according to claim 2, wherein the user selectable tables include capability of the optical system to follow up the change rate in the operating speed of said operating member.

6. An image pickup apparatus according to claim 2, wherein the user selectable tables include a stop reaction sensitivity of said optical system corresponding to the driving speed of said optical system.

7. An image pickup apparatus according to claim 2, wherein the user selectable tables includes at least one selected from the group consisting of sampling intervals at which the change rate in the operating speed of said operating member is sampled, the driving speed of said optical system, capability of the optical system to follow up the change rate in the operating speed of said operating member, and a stop reaction sensitivity of said optical system corresponding to the driving speed of said optical system.

8. An image pickup apparatus according to claim 2, wherein said optical system comprises a zoom lens system.

9. An image pickup apparatus according to claim 2, wherein said operating member comprises a rotary operating member.

10. A computer-readable storage medium storing a program for causing a computer to execute an image pickup method for an image pickup apparatus including an optical system having an optical axis, and an operating member disposed concentrically with the optical axis of the optical system, the image pickup method comprising:

a selection step of permitting a menu screen to be displayed on a display section and permitting a user, using the menu screen, to select one table from a plurality of user selectable tables that each provide a sampling period of a change rate in operating speed of the operating member;

a detection step of detecting a change rate in operating speed of the operating member by counting pulses generated when operating the operating member and integrating the counted pulses with the sampling period provided by the selected one table;

a driving speed determining step of determining a driving speed of the optical system based on the change rate in the operating speed of the operating member detected in said detecting step and the selected one table; and a driving speed actuating step of actuating the optical system according to the driving speed determined in the driving speed determining step.

* * * * *